331-98
SEARCH ROOM

March 9, 1965 G. J. McCULLOCH 3,173,106

MICROWAVE OSCILLATOR WITH BIMETAL TEMPERATURE COMPENSATION

Filed Sept. 5, 1961 3 Sheets-Sheet 1

March 9, 1965 G. J. McCULLOCH 3,173,106

MICROWAVE OSCILLATOR WITH BIMETAL TEMPERATURE COMPENSATION

Filed Sept. 5, 1961 3 Sheets-Sheet 2

3,173,106
MICROWAVE OSCILLATOR WITH BIMETAL TEMPERATURE COMPENSATION

Garland J. McCulloch, Tampa, Fla., assignor to Trak Microwave Corporation, Tampa, Fla.

Filed Sept. 5, 1961, Ser. No. 135,983
7 Claims. (Cl. 331—98)

This invention relates to the generation of high-frequency electrical signals and is described as embodied in a reentrant type temperature-compensated coaxial oscillator for the generation of microwave signals.

It is an object of this invention to provide an oscillator capable of efficient and stable operation over relatively wide ranges of frequencies and wherein the operating characteristics are automatically compensated for temperature changes.

Another object is to provide such an oscillator in which the frequency of the generated signal can be varied by a single mechanical adjustment while maintaining high operating efficiency.

Another object is to provide a sturdy oscillator assembly which by virtue of the features described below is capable of withstanding severe shock and vibration thus suiting it to the needs of rigorous military requirements.

Still another object is to provide an oscillator which is small in size and which can be rapidly and economically fabricated by conventional techniques from readily available materials.

Still another object is to provide such an oscillator capable of accepting oscillator tubes which have substantial variations in physical dimensions from tube to tube.

Another object of the invention is to provide an improved means for making electrical and mechanical contacts with the vacuum tube elements.

Still another obpect is to provide improved mechanical support, while maintaining efficient electrical operation, for the mechanical elements of the coaxial oscillator.

These and other objects and advantages will become apparent from consideration of the following detailed description of one embodiment of the invention considered in conjunction with the accompanying drawings in which.

Figures 1, 2:
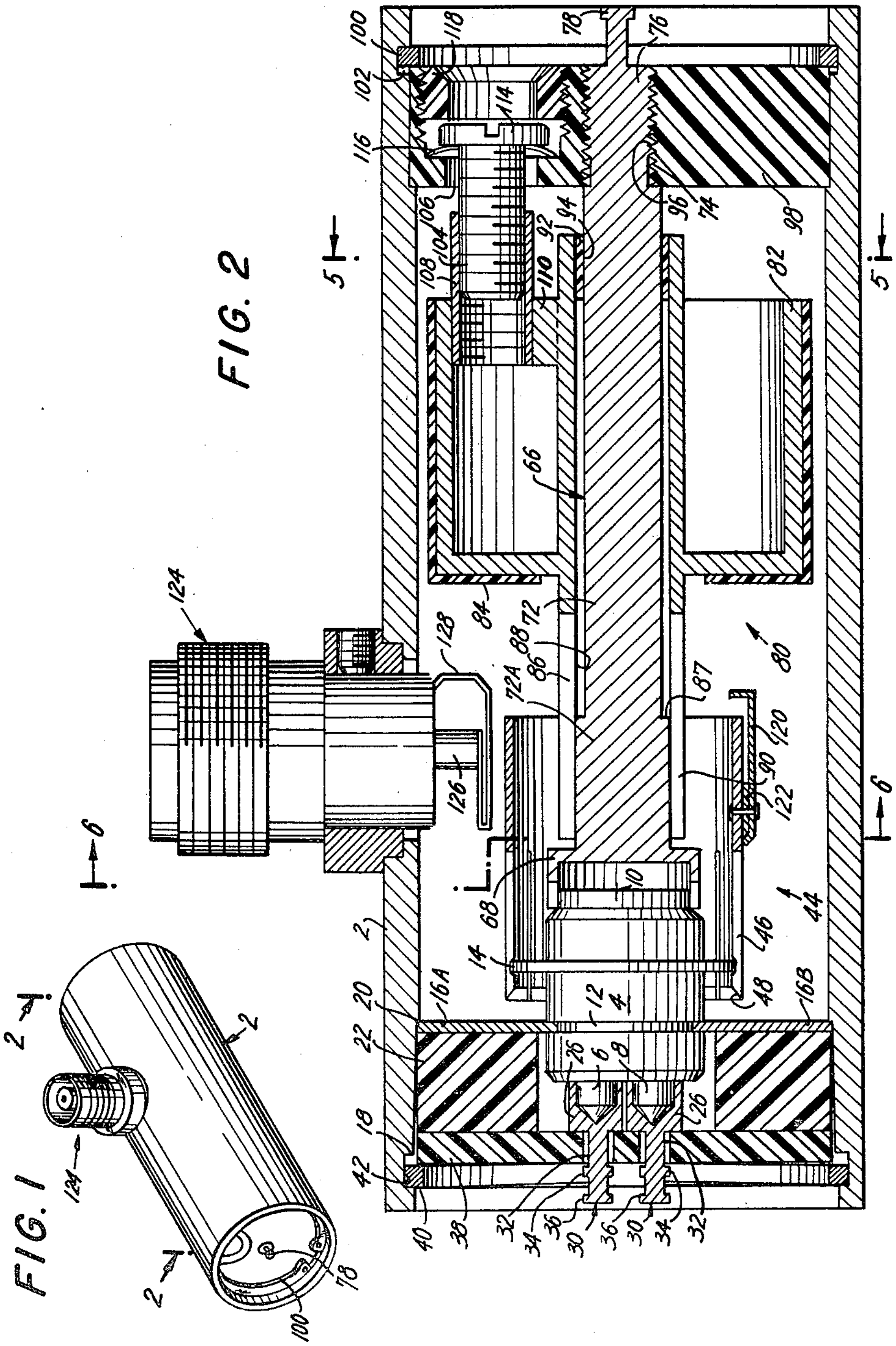
FIGURE 1 is a perspective view of a coaxial oscillator embodying the invention.
FIGURE 2 is a longitudinal sectional view taken along line 2—2 of FIGURE 1.

The oscillator is housed within a cylindrical tubular shell 2 as shown in FIGURE 1. This particular cavity makes use of a vacuum tube 4 (FIGURE 3) designated as type TK9127 by Trak Microwave Corporation of Tampa, Florida, and as type 7486 by General Electric Company. The tube 4 is a vacuum tube of ceramic construction having planar cathode, grid and anode structures, the insulating portions of the tube being formed of ceramic and the active elements being formed primarily of titanium. The tube 4 is generally cylindrical in shape with heater contact pins 6 and 8 (FIGURES 2 and 3) protruding from one end of the shell and an anode cap 10 protruding from the opposite end. The cathode of the tube is connected to an annular cathode-contact ring 12 which encircles the tube and whose outer surface is recessed below the surface of the ceramic body of the tube. Its grid is connected to an annular grid-contact ring 14 which extends outwardly beyond the ceramic body of the tube. In order to achieve operation at high frequencies, the tube is of small dimensions, and in comparison with the size of the tube, there may be substantial variations in the dimensions and positions of external connecting members. The coaxial oscillator described here has been arranged to accommodate substantial dimensional variations in the tube structure.

In operation, the cathode and cathode-contact ring 12 are maintained at the potential of the outer shell 2. This is accomplished by means of two cathode-contact segments 16A and 16B, each of which is formed of a semi-annular portion of a washer formed, for example, of soft brass. The inner diameter of these cathode-contact segments are cut to fit in intimate contact with the outer surface of the cathode-contact ring 12, and their outer surfaces are dimensioned to fit tightly against the inner surface of the shell 2. It is important for high frequency operation that the cathode-contact segments 16A and 16B make contact as nearly as possible completely around the interior and exterior diameters. In order to accomplish this, an annular taper is provided on the inner surface of shell 2 commencing at the point generally indicated at 18 in FIGURE 2 and decreasing in diameter to a shoulder generally indicated at 20. Thus, in mounting the tube in shell 2, the cathode-contact segments 16A and 16B are positioned around the cathode-contact ring 12 and forced with the tube along the internal taper of shell 2 from point 18 into abutment with the annular shoulder 20, wedging cathode segments 16A and 16B tightly against both the inner surface of shell 2 and the cathode-contact ring 12.

It is important that the material of which the cathode-contact segments 16A and 16B is formed be of softer metal than the cathode-contact ring 12 and that it have substantially the same coefficient of expansion as the metal from which the shell 2 is formed. In this particular instance the shell 2 is formed of brass, the cathode-contact ring 12 of titanium and the cathode-contact segments 16A and 16B of one-half hard brass.

An annular spacer bushing 22 formed of Bakelite or other suitable insulating material is positioned adjacent the cathode-contact segments 16A and 16B.

Connection to the heater contact pins 6 and 8 is made respectively by heater pin sockets generally indicated at 24A and 24B. Each of these heater pin sockets is provided with an enlarged head portion 26 having integrally formed spring fingers 28 which engage and press inwardly on the heater contact pins 6 and 8. Each heater pin socket has an anchor pin 30 which extends axially from the tube 4 and consists of a section 32 of reduced diameter, and an enlarged head 34. A portion 36 is formed for making electrical connection to the heater circuit. The head 34 is dimensioned to pass through one of the openings 37 in a socket-support wafer 38 formed of Bakelite or other suitable material. As can be seen in FIGURE 2, the reduced section 32 of each socket is smaller in diameter than the opening 37 in the support wafer so that each heater pin socket 24A and 24B can move a significant amount laterally and angularly with respect to the socket-support wafer.

This freedom to accommodate movement of the heater pin sockets 24A and 24B is important because the heater contact pins 6 and 8 may be positioned in slightly different positions in different tubes and may even extend from the body of the tube 4 at an angle with respect to the longitudinal axis of the tube. In addition, one of the heater pins 6 and 8 may extend further in the longitudinal direction than the other. For this reason the socket-support wafer 38 is preferably one or two thousandths of an inch smaller than the internal diameter of the shell 2 so that the wafer 38 is free to cock slightly within the shell 2 and thus maintain each of the heater pin sockets 24A and 24B in firm contact with the pins 6 and 8. The terminal portion 36 extends through the wafer 38, and heater voltage is applied to the oscillator by soldering appropriate leads to these terminals.

In order to force the heater pin sockets 24A and 24B into firm engagement with the heater contact pins 6 and 8 to maintain firm contact even under conditions of severe vibration, the socket-support wafer is held in place and urged toward the tube 4 by means of a snap ring 40 positioned within a counterbore 42 in the internal surface of the shell 2. The snap ring 40 is formed of spring material and has, as can be seen in FIGURE 2, a permanent bow in the longitudinal direction of the cavity and thus applies continuous pressure to the heater circuit contacts.

Figures 4, 5, 6:
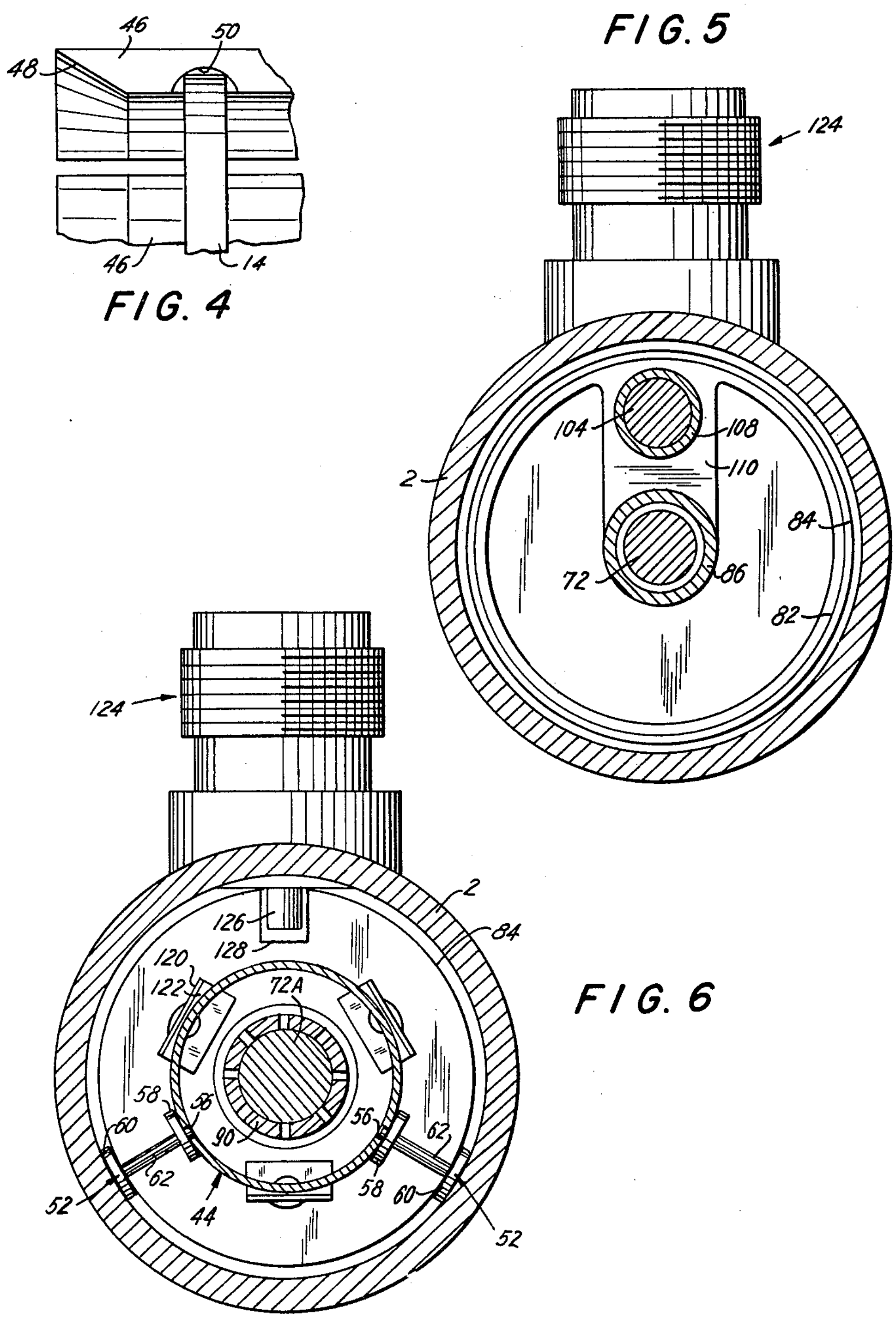
FIGURE 4 is an enlarged partial sectional view showing the engagement of the grid-contact ring with the grid sleeve and of operation of the cavity oscillator.
FIGURE 5 is a sectional view taken along line 5—5 of FIGURE 2.
FIGURE 6 is a sectional view taken along line 6—6 of FIGURE 2.

Tuned circuits are provided within the shell 2 for both the grid and the anode circuits. These two tuned circuits are interrelated both mechanically and electrically, and the operation is not readily explained accurately in terms of lumped constants. In certain instances common mechanical parts form portions of both circuits. An annular grid sleeve 44, which operates in the half-wave mode, is provided with a series of parallel cuts at one end which form spring fingers 46. The ends of these spring fingers are provided with an internal taper or chamfer 48 (FIGURE 2) at the ends to permit the grid sleeve 44 to be pushed over the outer circumference of the grid-contact ring 14 until the grid contact ring engages a counterbore 50 on the internal surface of the spring finger 46. The internal surface of the counterbore 50 is generally semi-circular in shape (see FIGURE 4) whereas the outer edge of the grid-contact ring 14 has square corners with a surface parallel with the longitudinal axis of the shell 2. This arrangement insures good electrical contact between each of the spring fingers 46 and the grid ring 14. This continuous peripheral contact is important for effective operation of the oscillator.

In one sense, the outer surface of the grid sleeve 44 forms the inner conductor of a one-half wave resonant coaxial line of which the outer conductor is formed by the inner surface of the shell 2.

The free end of the grid sleeve 44 is supported by three radially-spaced supporting members 52 (FIGURES 3 and 6) extending between the grid sleeve 44 and inner surface of the shell 2. Any dielectric material positioned within this portion of the coaxial line disturbs the field, and for this reason the supporting members 52 are formed of low-loss insulating material and are structurally arranged to provide minimum disturbance. In this particular example, the members are formed of a resilient plastic material, for example, such as "Kel-F" trifluorochlorethylene plastic material, but other suitable dielectric material may be used. Each of the support members 52 is provided with an anchor tip 54 which engages a hole 56 in the sleeve 44. An enlarged base portion 58 engages the outer surface of the grid sleeve 44, and a disc-like head portion 60 engages the inner surface of shell 2. The base 58 is connected to the head portion by a stem 62 of reduced cross section which is of the minimum size necessary to provide the desired mechanical support. The head 60 is formed with a plane surface which fits against the shell 2. The surface of the head 60 is distorted by the radial force and made to conform with the curvature of the inner surface of the shell 2. With this arrangement each of the supporting members 52 acts like a spring support because of the resistancy of the plastic material of which the members 52 are formed. When these members are formed of thermoplastic material, the head 60 in use may acquire a permanent set, and in the case of "Kel-F" material may actually adhere to the inner surface of the shell 2.

Figure 3:
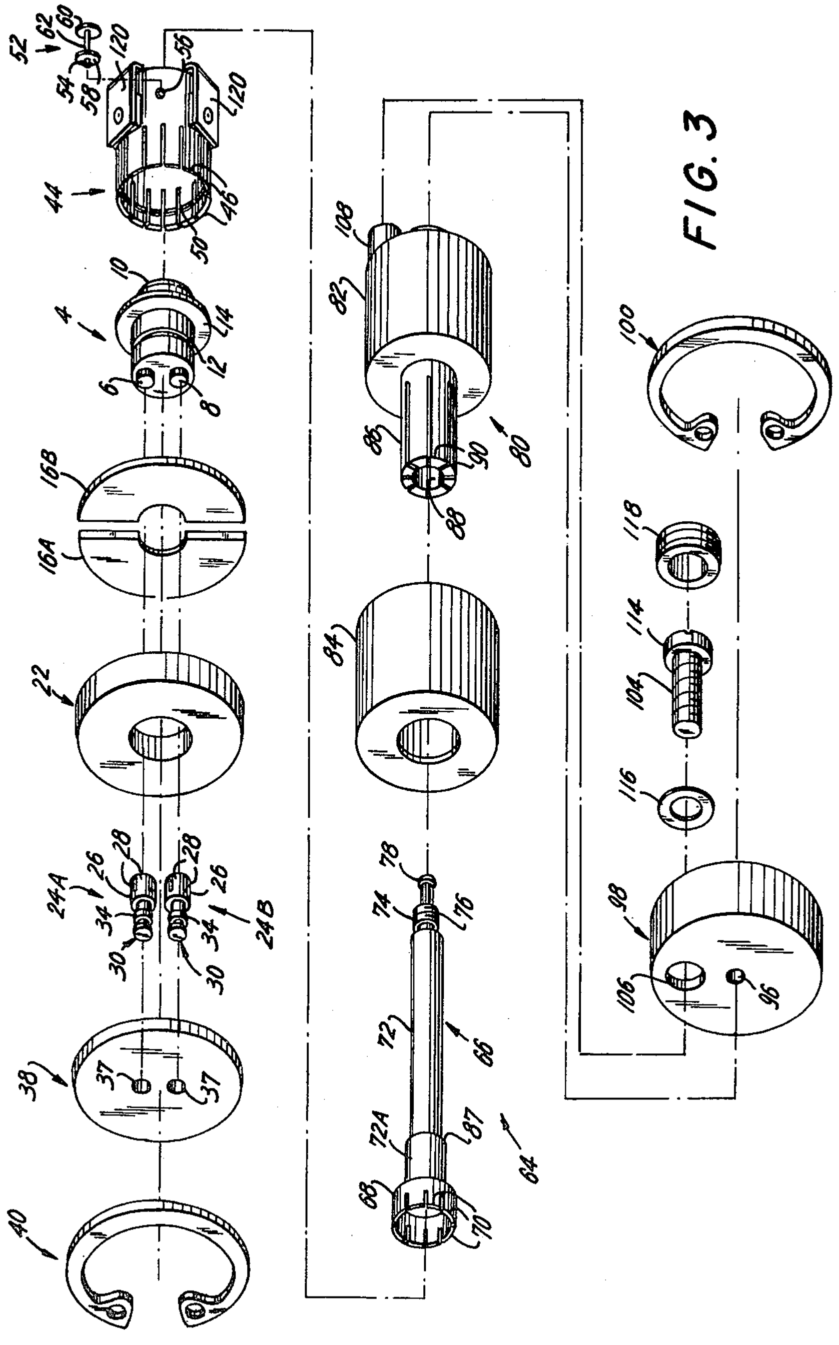
FIGURE 3 is a perspective view of various parts of the oscillator.

The anode circuit, which in this example operates in the three-quarter-wave length mode, is formed by an anode line assembly generally indicated at 64 (FIGURE 3). An anode inner conductor generally indicated at 66 is provided with an enlarged anode socket portion 68, the open end of which is provided with spring fingers 70 which define an opening adapted to receive the anode cap 10, the spring fingers 70 assuring good peripheral contact with the anode cap 10.

Extending longitudinally of the shell 2 and formed integrally with the socket 68 is a cylindrical line portion 72 of reduced diameter. A short section of the line 72, indicated at 72A adjacent the head 68, has a slightly larger diameter, for example 1 or 2 thousandths than the remainder of the line 72. At the opposite end of the line 72, a portion of reduced cross section 74 joins the line to an enlarged threaded section 76. In this example, a solder terminal 78 is formed integrally with the line 72 for the application of B+ voltage to the tube.

The other portion of the anode line assembly is formed by a tuning assembly, generally indicated at 80, which includes a quarter-wave choke joint 82 which serves as a termination for the coaxial anode line and prevents radiation of R-F energy. The quarter-wave choke joint 82 in this example is shown as having a short circuit on the end nearest the tube 4 and an open circuit at the opposite end. In practice, however, the choke joint may be reversed with the open end facing the tube 4. The outer surface of the choke joint 82 is covered with a layer 84 (FIGURE 2) of insulating material, for example, formed from a sheet of plastic material, for example, such as "Teflon" polytetrafluoroethylene. This dielectric material 84 insulates the choke joint from the shell 2 so far as direct current is concerned and also increases the capacity between the choke joint and the shell 2, thereby shortening the over-all length of the choke joint. The insulation also provides mechanical damping of the choke structure to eliminate mechanical resonances that might cause microphonic response in the oscillator.

A cylindrical extension 86 formed integrally with the choke joint 82 extends from the face of the choke joint toward the tube 4. The extension 86, whose outer diameter preferably is approximately the same as the outer diameter of the anode socket 68, has an internal bore 88 which receives the anode line 72. The free end of the extension 86 is provided with spring fingers 90 which make contact with the outer surface of the portion 72A of the anode inner conductor.

There is a reduction in diameter of the anode inner conductor beyond the point 87. When the tuning assembly 80 is positioned with the end of extension 86 immediately adjacent the socket 68, this extension forms the inner conductor of the anode line. In one sense it may be considered that a portion of the outer conductor of the anode line is formed by the inner surface of the grid sleeve 44. When the extension 86 is moved away from the socket 68, a portion of the anode inner conductor 72A is exposed between the socket 68 and the end of the extension 86 which changes the characteristic impedance of the anode line. The portion 72A of the anode inner conductor is of slightly larger diameter than the portion further removed from the socket 68 beyond the point 87 to insure that contact between the extension 86 and the anode inner conductor 66 will be made only through the spring fingers 90.

A bearing member 92 (FIGURE 2) is mounted within the choke joint 82 and has a longitudinal opening 94 which serves as a bearing surface for the anode inner conductor 66. The threaded portion 76 of the anode inner conductor is in engagement with a threaded opening 96 in an end cap 98. The end cap 98 forms a sliding fit within the shell 2 and preferably is constructed of phenolic plastic or another material having high radio-frequency losses to further reduce the chance of leakage of radio-frequency energy. This end cap is maintained under continuous longitudinal pressure in the direction of the tube 4 by a bowed snap ring 100, similar to the snap ring 40, which is made of spring material and arranged to fit within a counterbore 102 in the shell 2.

The bowed portion of the snap ring 100 pushes against the end cap 98 and thus maintains the socket 68 at all times in firm engagement with the anode cap 10. It will be noted that this is made possible because the length of anode line 66 does not change during tuning, the only moving part is the tuning assembly 80 which rides on the line 66.

To provide manual adjustment of the operating frequency of the oscillator, a screw 104 (FIGURE 2) extends through an opening 106 in the end cap 98 into threaded engagement with an internally threaded bushing 108 mounted in a member 110 within the choke joint 82. The bushing 108, after threading, has been provided with two longitudinal cuts and then squeezed together so as to provide a tight fit with the threads of the adjusting screw 104 to eliminate backlash.

The head 114 of the screw 104 is positioned in a recessed threaded opening in the end cap 98. A cupped spring washer 116 in the bottom of the recess maintains the screw 104 under continuous tension, thus further aiding in the prevention of backlash. When the screw 104 is turned, the tuning assembly 80 is moved longitudinally within the shell 2, thus simultaneously adjusting the distance between the end of extension 86 and the adjacent surface of the socket 68 and the length of the anode line between the anode cap 10 and choke joint 82. A locknut 118 holds the screw head.

To compensate automatically for the effect of change in the temperature, three generally L-shaped bimetal strips 120 are mounted on the grid sleeve 44. Each of these bimetal strips is secured to the sleeve 44 through a metal spacer 122 which may, for example, be approximately ten thousandths of an inch in thickness. Each bimetal strip 120 extends beyond and around the free end of the grid sleeve 44. The free end of each bimetal strip moves radially with change in temperature. As the operating temperature of the oscillator increases, the metal of which the parts of the oscillator are formed expands, thus lowering the frequency of the signal generated. The bimetal strips 120 are arranged so that their free ends deflect outwardly with increasing temperature and thereby decrease the capacity between the grid sleeve 44 and the anode line assembly 64 tending to produce an increase in frequency to compensate for the change in temperature. A thermostat metal strip is used to form the compensating element 120, for example, a bimetallic material which is found to be advantageous for the elements 120 has a thickness of 0.020 of an inch and is obtained from Metals and Controls Corporation of Attleboro, Massachusetts, under the designation "Truflex" Type B1. The L-shaped ends are formed by bending at a right angle a short length at the free end which is approximately 1/16 of an inch long, whereby the free end is positioned approximately .020 to .030 of an inch from the anode line 86. The bend is made after heating to determine the direction of movement of the bimetal strip which should be outward at the free end. The base end of each strip 120 is soldered to the spacer piece 122, which is soldered to the grid sleeve 44.

The three bimetal elements are positioned radially around the grid sleeve 44 which permits accurate temperature compensation even though the grid sleeve 44 may not be exactly coaxial with the center conductor 86.

Power is withdrawn from the oscillator through a conventional coaxial fitting 124 (FIGURE 1 and 3) mounted in the shell 2. The inner conductor 126 of the connector is connected to one end of a pick-up loop 128 extending within the shell 2. A capacitance pick-up probe may be substituted for the loop 128.

In the construction of a coaxial oscillator of the type described here, the dimensions can be in part calculated by proven methods and in part best determined empirically. The grid tank circuit is the primary frequency determining element. The length of the grid sleeve is determined for proper operation at the center of the desired tuning range. It is important that the anode line have the proper characteristic impedance to match the dynamic impedance of the tube. A small difference in the diameter of the anode line and thus in its characteristic impedance makes a substantial difference in the output power. The position of the choke joint primarily affects the phase of the energy fed back from the anode circuit to the grid circuit and is best determined experimentally.

As stated above, the average characteristic impedance of the anode line chanegs as the adjusting screw 104 is turned. The rate of change of characteristic impedance with linear movement depends upon the dimensions of the extension 86 and the anode inner conductor 66. This rate of change is adjusted so that the change in feedback characteristics produced by the simultaneous movement of the choke joint produces maximum power output over the desired tuning range.

In general, the parts of the cavity are formed of brass, and all parts are silver plated to reduce R-F resistance. Wherever possible, it is desirable that spring fingers be formed of suitable spring material such as phosphor bronze or beryllium copper. The grid sleeve including the spring fingers 46 and the socket 68 with the fingers 80 may be formed of one-half hard brass.

From the foregoing it will be seen that the coaxial oscillator described herein is well adapted to achieve the ends and objects set forth above and that its simplified mechanical structure results in a rugged oscillator that can be readily and economically manufactured by conventional manufacturing methods.

What is claimed is:

1. A coaxial oscillator having a tubular outer shell, a vacuum tube positioned within said outer shell and having a cathode, a grid and an anode, means for electrically connecting said cathode to said outer shell, an anode line assembly electrically connected with said anode and extending within said shell, a grid sleeve electrically connected to said grid and extending around said anode line assembly in spaced relationship therewith, and at least one temperature-compensating thermostatic element secured to said grid sleeve and in close spaced, capacitive relationship with said anode line assembly for changing the capacitance between said grid sleeve and said anode line assembly in response to changes in temperature.

2. A coaxial oscillator as claimed in claim 1 and wherein said thermostatic element is adapted to move farther away from said anode line assembly with an increase in temperature for decreasing the capacitance between said grid sleeve and anode line assembly, whereby the decrease in capacitance tends to raise the oscillator frequency, thereby to counteract the temperature expansion of the oscillator components which tends to decrease the oscillator frequency.

3. A microwave oscillator comprising housing means defining an oscillator cavity, a vacuum tube positioned within said cavity, said vacuum tube having a cathode, connection means electrically connecting said cathode with said housing means, an anode with an anode terminal line electrically connected thereto extending from one end of said tube and a grid with a grid-contact ring electrically connected to said grid and extending beyond the perimeter of said tube in a region between said anode terminal line and said cathode connection means, a grid sleeve including a plurality of resilient fingers engaging said grid-contact ring, said grid sleeve extending beyond said one end of the tube about said anode terminal line, and at least one bimetallic strip having a first end secured to said grid sleeve with the second end of said bimetallic strip extending beyond the end of said grid sleeve in spaced, capacitative relationship with said anode terminal line for changing the capacitance between said grid sleeve and said line in response to changes in temperature.

4. A microwave oscillator as claimed in claim 3 and wherein said grid sleeve includes a cylindrical portion with said resilient fingers extending from one end of said cylindrical portion, the first end of said bimetallic strip being secured to the outside of said cylindrical portion near the junction with said resilient fingers.

5. A coaxial oscillator having a tubular outer shell, a vacuum tube positioned within said shell extending longitudinally of said shell and having a cathode, a grid and an anode with an anode terminal at one end of the tube, connection means for forming an electrical connection between said cathode and said shell, an annular grid-contact ring making electrical contact with said grid and projecting out circumferentially around the tube, a cylindrical grid sleeve surrounding the tube in spaced relationship therewith and frictionally engaging said grid-contact ring and extending longitudinally within said outer shell and extending beyond said anode terminal at said end of the tube, an anode line assembly having a head portion adapted to frictionally engage said anode terminal and a line portion extending therefrom coaxially within said shell and within said grid sleeve, and a bimetal strip secured to said grid sleeve and having a free end portion extending from said grid sleeve in cantilever relationship with said grid sleeve, said end portion being positioned beyond the end of said grid sleeve and being bent radially inwardly with respect to the end of said grid sleeve, whereby the capacitance between said grid sleeve and said anode line changes as a function of changes in temperature.

6. A coaxial microwave oscillator comprising a tubular outer metal shell, a vacuum tube of the planar electrode type positioned within said shell extending axially of the shell concentric therewith, said tube having formed integrally therewith first and second heater contact pins, an annular grid-contact ring surrounding the tube and projecting beyond the adjacent portions of the tube, an annular cathode-contact ring electrically connected to said shell, and an anode cap, an annular grid sleeve concentric within said shell and having a plurality of spring fingers adjacent one end thereof and adapted to receive said grid-contact ring, grid sleeve supporting means for supporting said grid sleeve within said shell including at least three supporting members of insulating material spaced radially around said grid sleeve and each having an end portion adapted to engage said grid sleeve and a head portion adapted to make contact with the inner surface of said shell, an anode line assembly having a head portion with spring fingers formed integrally therewith and adapted to frictionally engage said anode cap of said tube and an inner conductor extending therefrom axially of said shell through a portion of said grid sleeve concentric with said sleeve, and at least three L-shaped bimetal strips each connected at one end to the exterior of said sleeve and extending in cantilever relationship with said sleeve beyond one end of said grid sleeve and having an end portion bent inwardly toward said inner conductor and free to move radially toward and away from said inner conductor as a function of changes in temperature.

7. A temperature-compensated microwave coaxial oscillator comprising a metal shell defining a cylindrical cavity therein, an electron tube axially positioned within said cavity, said electron tube being of the planar electrode type and being axially positioned within said cavity, said tube having a cathode, a grid, and an anode, electrical connection means connecting said cathode to said shell and defining an end wall of said cavity, said tube having a grid contact ring protruding from the tube in a radial direction and an anode terminal at one end of the tube within said cavity, an inner conductor electrically connected to said anode terminal and extending along the axis of said shell and insulated from said shell, and a grid sleeve conductor concentric with said inner conductor and with said shell, said sleeve conductor frictionally engaging said grid contact ring and insulated from said shell and surrounding a portion of said inner conductor, and a plurality of bimetallic elements secured to one of said conductors for changing the effective capacitance between said anode and grid sleeve conductors in response to temperature changes.

References Cited by the Examiner

UNITED STATES PATENTS

| | | | |
|---|---|---|---|
| 2,436,700 | 2/48 | Spielman | 331—176 |
| 2,561,727 | 7/51 | Cooper et al. | 331—98 |
| 2,755,344 | 7/56 | Reinsma | 330—56 |
| 2,874,288 | 2/59 | Jaffe | 331—98 |
| 2,994,042 | 7/61 | Power et al. | 331—98 |

ROY LAKE, *Primary Examiner.*

JOHN KOMINSKI, *Examiner.*